(12) United States Patent
Yoon et al.

(10) Patent No.: US 9,390,856 B2
(45) Date of Patent: Jul. 12, 2016

(54) DIELECTRIC COMPOSITION, MULTILAYER CERAMIC CAPACITOR USING THE SAME, AND METHOD FOR MANUFACTURING MULTILAYER CERAMIC CAPACITOR

(71) Applicant: Samsung Electro-Mechanics Co., Ltd., Suwon (KR)

(72) Inventors: Seok Hyun Yoon, Kimpo (KR); Jong Bong Lim, Changwon (KR); Jae Sung Park, Anyang (KR); Doo Young Kim, Suwon (KR); Chang Hoon Kim, Yongin (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 223 days.

(21) Appl. No.: 14/045,161

(22) Filed: Oct. 3, 2013

(65) Prior Publication Data

US 2014/0313634 A1 Oct. 23, 2014

(30) Foreign Application Priority Data

Apr. 17, 2013 (KR) .................. 10-2013-0042385

(51) Int. Cl.
*H01G 4/12* (2006.01)
*C04B 35/468* (2006.01)
(Continued)

(52) U.S. Cl.
CPC ............ *H01G 4/1227* (2013.01); *C04B 35/465* (2013.01); *C04B 35/4682* (2013.01); *C04B 35/49* (2013.01); *H01G 4/30* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3229* (2013.01);
(Continued)

(58) Field of Classification Search
CPC .............. C04B 35/468; C04B 35/4682; H01L 41/1871
See application file for complete search history.

(56) References Cited

U.S. PATENT DOCUMENTS

| 6,510,039 B1 * | 1/2003 | Morita ................ H01G 4/1227 361/321.2 |
| 6,613,706 B2 * | 9/2003 | Hagiwara ............... B32B 18/00 361/321.2 |
| 2009/0082192 A1 | 3/2009 | Ito et al. |

FOREIGN PATENT DOCUMENTS

| JP | 2002-362971 | 12/2002 |
| KR | 10-2002-0095068 | 12/2002 |

OTHER PUBLICATIONS

Arlt"Twinning in ferroelectric and ferroelastic ceramic:stress relief." J of Mat Science 25 (1990) 265-2666.*

*Primary Examiner* — Karl Group
(74) *Attorney, Agent, or Firm* — McDermott Will & Emery LLP

(57) ABSTRACT

A dielectric composition includes a base main component including Ba and Ti and an accessory component, wherein a ratio of domain width/grain size of the dielectric composition is in the range of 0 to 0.2, a multilayer ceramic capacitor using the same, and a method for manufacturing a multilayer ceramic capacitor. It is possible to provide a dielectric composition that can implement a higher dielectric constant and good high temperature withstand voltage characteristics in the same grain size condition. It is expected that this effect can be effectively applied to the development of ultra high capacity MLCCs having a thin dielectric by implementing the same capacity while increasing the thickness of the dielectric than the case of applying the conventional dielectric material.

12 Claims, 2 Drawing Sheets

(51) Int. Cl.
*H01G 4/30* (2006.01)
*C04B 35/465* (2006.01)
*C04B 35/49* (2006.01)

(52) U.S. Cl.
CPC . *C04B2235/3239* (2013.01); *C04B 2235/3241* (2013.01); *C04B 2235/3244* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/5445* (2013.01); *C04B 2235/78* (2013.01); *C04B 2235/788* (2013.01)

DIELECTRIC COMPOSITION, MULTILAYER CERAMIC CAPACITOR USING THE SAME, AND METHOD FOR MANUFACTURING MULTILAYER CERAMIC CAPACITOR

CROSS-REFERENCE TO RELATED APPLICATIONS

This application claims the foreign priority benefit of Korean Patent Application No. 10-2013-0042385, filed Apr. 17, 2013, which is hereby incorporated by reference in its entirety into this application.

BACKGROUND OF THE INVENTION

1. Field of the Invention

The present invention relates to a dielectric composition, a multilayer ceramic capacitor using the same, and a method for manufacturing a multilayer ceramic capacitor.

2. Description of the Related Art

Currently, dielectrics of high capacity base metal electrode (BME) MLCCs such as X5R, X7R, X8R, and Y5V are based on sintered materials obtained by additionally adding various accessory components to a $BaTiO_3$ base or a base modified by partially employing Ca or Zr.

These accessory component additive elements have functions such as suppression of grain growth, implementation of non-reducibility, and adjustment of dielectric characteristics to implement normal capacity and insulation characteristics of the MLCC.

Among these additive accessory components, Mg and Al, which are fixed-valence acceptors, and rare-earth elements account for the largest proportion. In addition, a small amount of variable-valence acceptors are added, and oxides containing sintering aids for increasing sinterability are included.

In the conventional compositions, a rare-earth element and Mg which is a fixed-valence acceptor, react with $BaTiO_3$ to form a core-shell structure, and the formation of the core-shell structure is required to implement normal MLCC characteristics.

Meanwhile, with the development of the high capacity MLCC, studies have been conducted to gradually reduce the thickness of the dielectric. In this case, implementation of reliability and high temperature withstand voltage characteristics has emerged as the important issue. One of the methods to overcome this problem is a method of achieving the same capacity by applying a thicker dielectric through an increase in dielectric constant of the dielectric.

RELATED ART DOCUMENT

Patent Document

Patent Document 1: U.S. Patent Laid-Open No. 2009-0082192

Non-Patent Document

Non-patent Document 1: Arlt et al., J. Appl. Phys., 58[4] 1619 (1985)

SUMMARY OF THE INVENTION

A method of easily increasing a dielectric constant in a $BaTiO_3$-based ferroelectric material in accordance with the present invention is to increase the size of a crystal grain. In this case, DC-bias characteristics and reliability are deteriorated. Therefore, in order to develop a high capacity MLCC, a solution to increase a dielectric constant of a dielectric while maintaining the small size of the crystal grain should be prepared.

However, in the conventional dielectric composition technologies, there are few documents that consider or present the solution. Therefore, there are few methods of achieving the above object.

Therefore, the present invention describes a phenomenon that a dielectric constant is increased by controlling a microstructure of a ferroelectric domain structure, a dielectric composition that can implement a high-k dielectric material having a small crystal grain size by applying the phenomenon, and a method for preparing the dielectric.

The present invention has been invented in order to overcome the above-described problems and it is, therefore, an object of the present invention to provide a high-k dielectric composition that has an increased dielectric constant by controlling a microstructure of a ferroelectric domain structure.

Further, it is another object of the present invention to provide a dielectric composition that can be fired in a reducing atmosphere and satisfy X5R, X7R, or Y5V characteristics specified in EIA standards.

Further, it is another object of the present invention to provide a multilayer ceramic capacitor that can use a Ni internal electrode and be sintered in a reducing atmosphere at below 1250° C.

Further, it is another object of the present invention to provide a method for manufacturing a multilayer ceramic capacitor that has an excellent dielectric constant by controlling a microstructure of a ferroelectric domain structure.

In accordance with one aspect of the present invention to achieve the object, there is provided a dielectric composition including: a base main component including Ba and Ti and an accessory component, wherein a ratio of domain width/grain size of the dielectric composition is in the range of 0 to 0.2.

The base may be one or more selected from the group consisting of $BaTiO_3$, $(Ba_{1-x}Ca_x)(Ti_{1-y}Ca_y)O_3$ (here, $0 \leq x \leq 0.3$, $0 \leq y \leq 0.1$), $(Ba_{1-x}Ca_x)(Ti_{1-y}Zr_y)O_3$ (here, $0 \leq x \leq 0.3$, $0 \leq y \leq 0.5$), and $Ba(Ti_{1-y}Zr_y)O_3$ (here, $0 \leq y \leq 0.5$).

It is preferred that a particle size of a starting material of the main component is less than 1.0 μm.

In accordance with an embodiment of the present invention, the accessory component may include a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element.

The accessory component may include 0.1 to 2.0 at % of the first accessory component; 0 to 2.0 at % of the second accessory component; 0 to 4.0 at % of the third accessory component; 0 to 4.0 at % of the fourth accessory component; 0 to 20 at % of the fifth accessory component; and 0 to 3.0 at % of the sixth accessory component.

The dielectric composition may satisfy X5R or X7R standards.

Further, in accordance with another aspect of the present invention to achieve the object, there is provided a dielectric composition including: a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio Ba/Si of the content of the fourth accessory component Ba to the content of the sixth accessory component Si is y, the relationship between x and y is in the range of upper and lower straight boundaries based on a dotted line $y=1.2-0.64x$ of FIG. 1.

The base may be one or more selected from the group consisting of $BaTiO_3$, $(Ba_{1-x}Ca_x)(Ti_{1-y}Ca_y)O_3$ (here, $0 \leq x \leq 0.3$, $0 \leq y \leq 0.1$), $(Ba_{1-x}Ca_x)(Ti_{1-y}Zr_y)O_3$ (here, $0 \leq x \leq 0.3$, $0 \leq y \leq 0.5$), and $Ba(Ti_{1-y}Zr_y)O_3$ (here, $0 \leq y \leq 0.5$).

It is preferred that a particle size of a starting material of the main component is less than 1.0 μm.

The accessory component may include 0.1 to 2.0 at % of the first accessory component; 0 to 2.0 at % of the second accessory component; 0 to 4.0 at % of the third accessory component; 0 to 4.0 at % of the fourth accessory component; 0 to 20 at % of the fifth accessory component; and 0 to 3.0 at % of the sixth accessory component.

The dielectric composition may satisfy X5R or X7R standards.

Further, in accordance with another aspect of the present invention to achieve the object, there is provided a multilayer ceramic capacitor formed by alternately laminating a dielectric layer, which uses a dielectric composition including a base main component including Ba and Ti and an accessory component, and an internal electrode layer, wherein a ratio of domain width/grain size of the dielectric composition is in the range of 0 to 0.2.

It is preferred that the dielectric layer has a thickness of greater than 0.1 μm after firing.

The internal electrode layer may be made of nickel or nickel alloys.

Further, in accordance with another aspect of the present invention to achieve the object, there is provided a multilayer ceramic capacitor formed by alternately laminating a dielectric layer, which uses a dielectric composition including a base main component and an accessory component, and an internal electrode layer, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio Ba/Si of the content of the fourth accessory component Ba to the content of the sixth accessory component Si is y, the relationship between x and y is in the range of upper and lower straight boundaries based on a dotted line $y=1.2-0.64x$ of FIG. 1.

It is preferred that the dielectric layer has a thickness of greater than 0.1 μm after firing.

The internal electrode layer may be made of nickel or nickel alloys.

Further, in accordance with another aspect of the present invention to achieve the object, there is provided a method for manufacturing a multilayer ceramic capacitor, including the steps of: printing an internal electrode layer on a dielectric sheet and laminating the dielectric sheets; firing a chip formed by cutting the laminated sheets; reoxidizing the fired chip; applying an external electrode on the fired chip; firing an external electrode; and manufacturing a completed chip by plating the fired external electrode.

In accordance with an embodiment of the present invention, the dielectric sheet may use a dielectric composition including a base main component including Ba and Ti and an accessory component, wherein a ratio of domain width/grain size of the dielectric composition is in the range of 0 to 0.2.

Further, in accordance with another embodiment of the present invention, the dielectric sheet may use a dielectric composition including a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio Ba/Si of the content of the fourth accessory component Ba to the content of the sixth accessory component Si is y, the relationship between x and y is in the range of upper and lower straight boundaries based on a dotted line $y=1.2-0.64x$ of FIG. 1.

The firing may be performed in the range of 1100 to 1250° C.

The reoxidation may be a heat treatment in a $N_2$ atmosphere at 900 to 1100° C.

Further, in accordance with another aspect of the present invention to achieve the object, there is provided a method for manufacturing a multilayer ceramic capacitor, including the steps of: printing an internal electrode layer on a dielectric sheet and laminating the dielectric sheets; firing a chip formed by cutting the laminated sheets; applying an external electrode on the fired chip; firing an external electrode; manufacturing a completed chip by plating the fired external electrode; pressing the completed chip in the conditions of 150 to 250° C. and 0 to 10 MPa; and cooling the pressed chip to room temperature.

In accordance with an embodiment of the present invention, the dielectric sheet may use a dielectric composition including a base main component including Ba and Ti and an accessory component, wherein a ratio of domain width/grain size of the dielectric composition is in the range of 0 to 0.2.

Further, in accordance with another embodiment of the present invention, the dielectric sheet may use a dielectric composition including a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio Ba/Si of the content of the fourth accessory component Ba to the content of the sixth accessory component Si is y, the relationship between x and y is in the range of upper and lower straight boundaries based on a dotted line y=1.2−0.64x of FIG. 1.

The firing may be performed in the range of 1100 to 1250° C.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
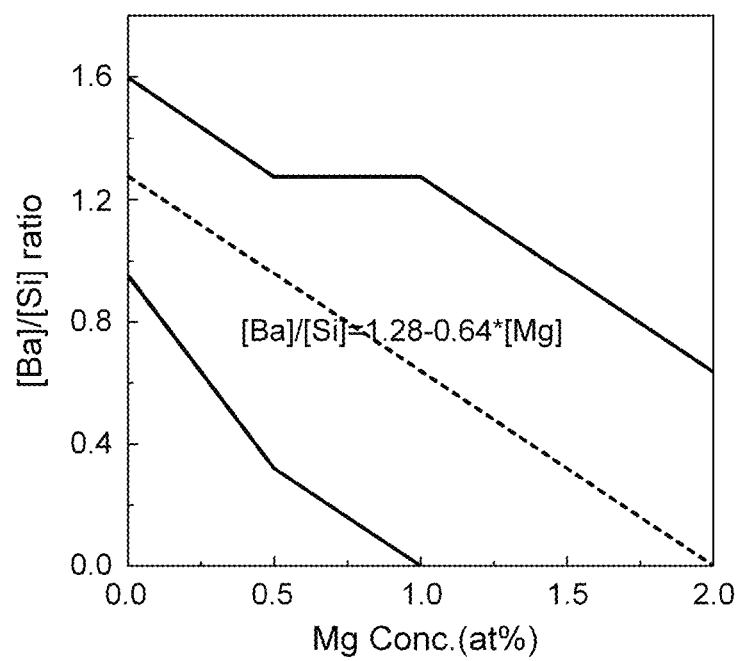
FIG. 1 shows the range of x and y in which a high dielectric constant and good high temperature withstand voltage characteristics are implemented when the content of a second accessory component Mg is x and a ratio [Ba/Si] of the content of the fourth accessory component Ba to the content of the sixth accessory component Si is y.

Hereinafter, the present invention will be described in detail.

Terms used herein are provided to explain embodiments, not limiting the present invention. Throughout this specification, the singular form includes the plural form unless the context clearly indicates otherwise. Further, terms "comprises" and/or "comprising" used herein specify the existence of described shapes, numbers, steps, operations, members, elements, and/or groups thereof, but do not preclude the existence or addition of one or more other shapes, numbers, operations, members, elements, and/or groups thereof.

The present invention relates to a dielectric composition that can increase a dielectric constant by reducing a domain size, a multilayer ceramic capacitor using the dielectric composition, and a method for manufacturing a multilayer ceramic capacitor that can increase a capacity by reducing a domain size through thermal and mechanical post-treatments of the multilayer ceramic capacitor.

A dielectric composition in accordance with the present invention includes a base main component including Ba and Ti and an accessory component, wherein a ratio of domain width/grain size of the dielectric composition is in the range of 0 to 0.2.

The base, which is a main component included in the dielectric composition in accordance with the present invention, may be one or more selected from the group consisting of $BaTiO_3$, $(Ba_{1-x}Ca_x)(Ti_{1-y}Ca_y)O_3$ (here, $0 \leq x \leq 0.3$, $0 \leq y \leq 0.1$), $(Ba_{1-x}Ca_x)(Ti_{1-y}Zr_y)O_3$ (here, $0 \leq x \leq 0.3$, $0 \leq y \leq 0.5$), and $Ba(Ti_{1-y}Zr_y)O_3$ (here, $0 \leq y \leq 0.5$).

That is, the principle of the dielectric constant increase effect by the method described in the present invention can be similarly applied to $BaTiO_3$-modified solid solution bases, such as $(Ba_{1-x}Ca_x)(Ti_{1-y}Ca_y)O_3$ (here, $0 \leq x \leq 0.3$, $0 \leq y \leq 0.1$), $(Ba_{1-x}Ca_x)(Ti_{1-y}Zr_y)O_3$ (here, $0 \leq x \leq 0.3$, $0 \leq y \leq 0.5$), and $Ba(Ti_{1-y}Zr_y)O_3$ (here, $0 \leq y \leq 0.5$) bases modified by partially employing Ca and Zr in BT, as well as a pure $BaTiO_3$ (BT) base.

The main component, whose starting material has a particle size of less than 1.0 μm, is suitable for a high capacity MLCC having a thin dielectric thickness, and if the particle size of the starting material exceeds 1.0 μm, short failures are increased when the dielectric thickness is small.

Further, the dielectric composition in accordance with the present invention may include a first accessory component including one or more variable-valence acceptor elements selected from the group consisting of Mn, V, Cr, Fe, Ni, Co, Cu, and Zn, oxides thereof, and carbonates thereof in an amount of 0.1 to 2.0 at % based on 100 mol % of the dielectric base main component.

The first accessory component, which is a variable-valence acceptor element and a compound including the same, performs a role of improving non-reducibility and reliability in the dielectric composition, and when the content thereof is excessive, that is, out of the range of 2.0 at % based 100 mol % of the dielectric base main component, it is not preferred due to a reduction in dielectric constant and an increase in aging rate.

Further, the dielectric composition in accordance with the present invention may include one or more second accessory components selected from the group consisting fixed-valence acceptor elements of Mg and Al, oxides thereof, and carbonates thereof in an amount of 0 to 2.0 at % based on 100 mol % of the dielectric base main component.

The second accessory component, which is a fixed-valence acceptor element and a compound including the same, is a main component that performs control of a microstructure (suppression of abnormal grain growth), endowment of non-reducibility, and formation of a core-shell structure in the dielectric composition, and when the content thereof exceeds 2.0 at % based on 100 mol % of the dielectric base main component, it is not preferred due to a reduction in dielectric constant.

Further, the dielectric composition in accordance with the present invention may include a third accessory component including one or more rare-earth elements selected from the group consisting of Y, Dy, Ho, Er, Gd, Ce, Nd, and Sm, oxides thereof, and carbonates thereof in an amount of 0 to 4.0 at % based on 100 mol % of the dielectric base main component.

The third accessory component, which is a rare-earth element and a compound including the same, is a main component that performs improvement of reliability of the dielectric composition and formation of a core-shell structure, and when the content thereof is out of the range of 0.0 to 4.0 at % based on 100 mol % of the dielectric composition, it is not preferred due to a reduction in dielectric constant and deterioration of high temperature withstand voltage characteristics.

Further, the dielectric composition in accordance with the present invention may include a fourth accessory component including a Ba element, oxides thereof, and carbonates thereof in an amount of 0 to 4.0 at % based on 100 mol % of the dielectric base main component.

The fourth accessory component performs promotion of sintering, adjustment of a dielectric constant, etc. in the dielectric composition, and when the content thereof is out of the range of 0.0 to 4.0 at % based on 100 mol % of the dielectric base main component, it is not preferred due to a reduction in dielectric constant and an increase in sintering temperature.

Further, the dielectric composition in accordance with the present invention may include a fifth accessory component including Ca and Zr elements, oxides thereof, and carbonates thereof in an amount of 0 to 20 at % based on 100 mol % of the dielectric base main component.

The fifth accessory component performs improves a dielectric constant and increases reliability by forming a core-shell structure in the dielectric composition, and when the content thereof is out of the range of 0.0 to 20 at % based on 100 mol % of the dielectric base main component, it is not preferred due to a reduction in dielectric constant.

Further, the dielectric composition in accordance with the present invention may include a sixth accessory component including Si and Al elements, oxides thereof, carbonates thereof, and glass including a Si element in an amount of 0 to 3.0 at % based on 100 mol % of the dielectric base main component.

The sixth accessory component performs a role of a sintering additive in the dielectric composition, and when the content thereof is out of the range of 0.0 to 3.0 at % based on 100 mol % of the dielectric base main component, it is not preferred due to deterioration of sinterability and density and generation of a secondary phase.

The dielectric composition in accordance with the present invention, which has the above main and accessory components, has a ratio of domain width/grain size in the range of 0 to 0.2.

Figure 3:
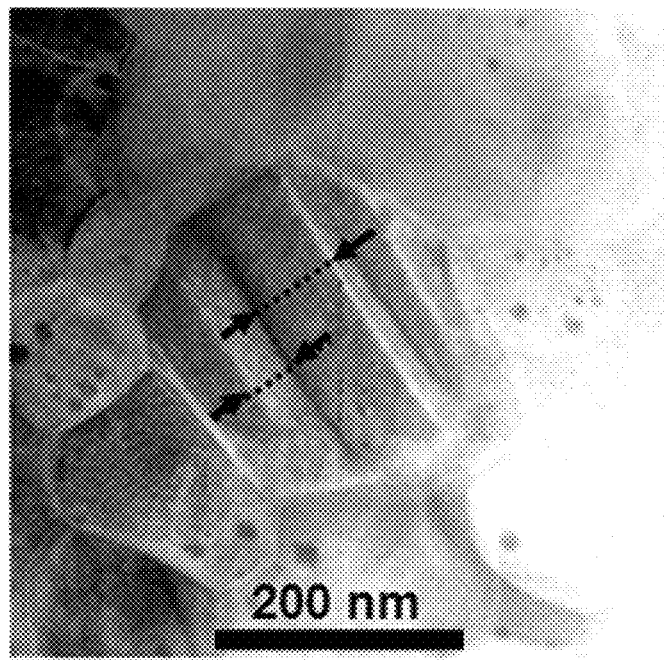
FIG. 3 shows the domain shape of a crystal grain of a sample No. 36.
Figure 4:
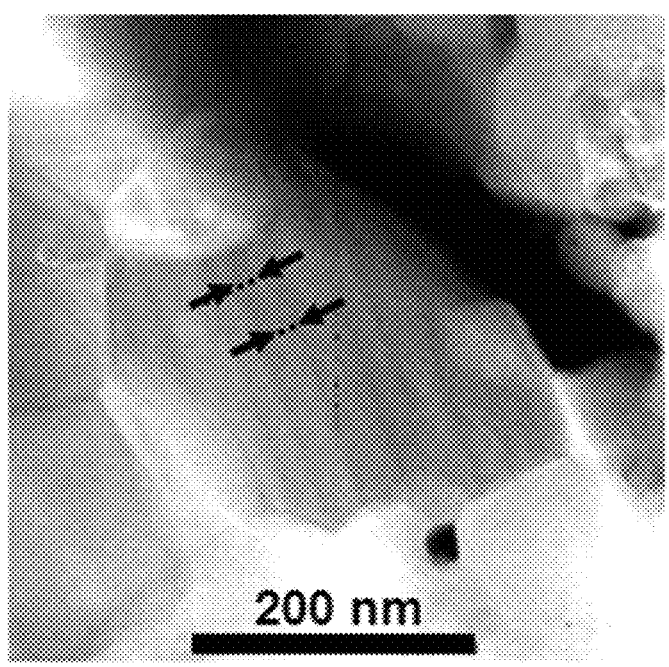
FIG. 4 shows the domain shape of a crystal grain of a sample No. 32.

The "domain" in the dielectric composition of the present invention means a pattern (a dotted portion of an arrow) such as a string or band observed in a crystal grain as can be checked in FIGS. 3 and 4, and the "width" thereof means a length of the string or band.

Further, the "crystal grain" in the dielectric composition of the present invention means each particle separated by a grain boundary, and the "size" thereof means an average of the length of a major axis and the length of a minor axis.

It is known that a dielectric constant ($\varepsilon_r$) in ferroelectric materials such as $BaTiO_3$ is determined by a dielectric constant ($\varepsilon_r$(volume)) by polarization caused by position displacement of a Ti ion due to the applied electric field and a dielectric constant ($\varepsilon_r$(domain wall)) by vibration and switching of a domain wall. This relationship is represented by the following equation 1.

$$\varepsilon_r = \varepsilon_r(\text{volume}) + \varepsilon_r(\text{domain} - \text{wall}) = \varepsilon_r(\text{volume}) + \frac{C}{d} \quad \text{Equation 1}$$

Here, d represents a thickness of the domain width, and C represents a constant value.

Therefore, in order to implement a high dielectric constant in the conditions of dielectrics having the same grain size, it can be estimated that the thickness of the domain width should be reduced and mobility of the domain wall should be increased. However, when the domain width is reduced and thus the domain walls are increased, it is very difficult to reduce the domain width without limit since a domain wall energy increment gradually becomes dominant.

Therefore, the present invention studied how the domain width can be reduced and checked that the manufacture of the microstructured dielectric having a small domain width thickness can be implemented by adjusting the components of the dielectric composition or by thermal and mechanical post-treatments.

Accordingly, the dielectric composition in accordance with the present invention uses the above dielectric composition so that the dielectric microstructure can have high dielectric constant characteristics when the ratio of the length of the domain width to the size of the crystal grain is in the range of 0 to 0.2.

When the ratio of the length of the domain width to the size of the crystal grain of the dielectric microstructure is out of the range of 0 to 0.2, it is not preferred since the desired dielectric constant characteristics in the present invention can't be implemented.

In accordance with another preferable embodiment of the present invention, a dielectric composition includes a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio (Ba/Si) of the content of the fourth accessory component Ba to the content of the sixth accessory component Si is y, the relationship between x and y is in the range of upper and lower straight boundaries based on a dotted line y=1.2−0.64x of FIG. 1.

Particularly, in order to optimize the size of a domain in a dielectric to have high dielectric characteristics, the dielectric composition includes the base main component and the accessory components and the relationship between x and y is in the range of the upper and lower straight boundaries based on the dotted line y=1.2−0.64x of FIG. 1 when the content of the second accessory component Mg is x and the ratio (Ba/Si) of the content of the fourth accessory component Ba to the content of the sixth accessory component Si is y.

That is, a domain structure having optimum dielectric characteristics can be manufactured by changing Ba/Si, which is the ratio of the content of the fourth accessory component Ba to the content of the sixth accessory component Si, while changing the content of the second accessory component Mg, and the range thereof can be checked in the graph of FIG. 1.

That is, when the content of the second accessory component Mg is x and the ratio (Ba/Si) of the content of the fourth accessory component Ba to the content of the sixth accessory component Si is y, it is checked that the optimum domain structure can be implemented when x and y are in the range of the upper and lower straight boundaries based on the dotted line satisfying y=1.2−0.64x.

The base used in the dielectric composition may be one or more selected from the group consisting of $BaTiO_3$, $(Ba_{1-x}Ca_x)(Ti_{1-y}Ca_y)O_3$ (here, 0≤x≤0.3, 0≤y≤0.1), $(Ba_{1-x}Ca_x)(Ti_{1-y}Zr_y)O_3$ (here, 0≤x≤0.3, 0≤y≤0.5), and $Ba(Ti_{1-y}Zr_y)O_3$ (here, 0≤y≤0.5).

That is, the principle of the dielectric constant increase effect by the method described in the present invention can be similarly applied to $BaTiO_3$-modified solid solution bases, such as $(Ba_{1-x}Ca_x)(Ti_{1-y}Ca_y)O_3$ (here, 0≤x≤0.3, 0≤y≤0.1), $(Ba_{1-x}Ca_x)(Ti_{1-y}Zr_y)O_3$ (here, 0≤x≤0.3, 0≤y≤0.5), and $Ba(Ti_{1-y}Zr_y)O_3$ (here, 0≤y≤0.5) modified by partially employing Ca and Zr in BT, as well as a pure $BaTiO_3$ (BT) base.

The main component, whose starting material has a particle size of less than 1.0 μm, is suitable for a high capacity MLCC having a small dielectric thickness, and when the particle size of the starting material exceeds 1.0 μm, short failures are increased when the dielectric thickness is small.

Further, the dielectric composition in accordance with the present invention may include a first accessory component including one or more variable-valence acceptor elements selected from the group consisting of Mn, V, Cr, Fe, Ni, Co, Cu, and Zn, oxides thereof, and carbonates thereof in an amount of 0.1 to 2.0 at % based on 100 mol % of the dielectric base main component.

The first accessory component, which is a variable-valence acceptor element and a compound including the same, performs a role of improving reducing resistance and reliability in the dielectric composition, and when the content thereof is excessive, that is, out of the range of 2.0 at % based 100 mol % of the dielectric base main component, it is not preferred due to a reduction in dielectric constant and an increase in aging rate.

Further, the dielectric composition in accordance with the present invention may include one or more second accessory components selected from the group consisting fixed-valence acceptor elements of Mg and Al, oxides thereof, and carbonates thereof in an amount of 0 to 2.0 at % based on 100 mol % of the dielectric base main component.

The second accessory component, which is a fixed-valence element and a compound including the same, is a main component that performs control of a microstructure (suppression of abnormal grain growth), endowment of non-reducibility, and formation of a core-shell structure in the dielectric composition, and when the content thereof exceeds 2.0 at % based on 100 mol % of the dielectric base main component, it is not preferred due to a reduction in dielectric constant.

Further, the dielectric composition in accordance with the present invention may include a third accessory component including one or more rare-earth elements selected from the group consisting of Y, Dy, Ho, Er, Gd, Ce, Nd, and Sm, oxides thereof, and carbonates thereof in an amount of 0 to 4.0 at % based on 100 mol % of the dielectric base main component.

The third accessory component, which is a rare-earth element and a compound including the same, is a main component that performs improvement of reliability and formation of a core-shell structure in the dielectric composition, and when the content thereof is out of the range of 0.0 to 4.0 at % based on 100 mol % of the dielectric composition, it is not preferred due to a reduction in dielectric constant and deterioration of high temperature withstand voltage characteristics.

Further, the dielectric composition in accordance with the present invention may include a fourth accessory component including a Ba element, oxides thereof, and carbonates thereof in an amount of 0 to 4.0 at % based on 100 mol % of the dielectric base main component.

The fourth accessory component performs promotion of sintering and adjustment of a dielectric constant in the dielectric composition, and when the content thereof is out of the range of 0.0 to 4.0 at % based on 100 mol % of the dielectric base main component, it is not preferred due to a reduction in dielectric constant and an increase in sintering temperature.

Further, the dielectric composition in accordance with the present invention may include a fifth accessory component including Ca and Zr elements, oxides thereof, and carbonates thereof in an amount of 0 to 20 at % based on 100 mol % of the dielectric base main component.

The fifth accessory component improves a dielectric constant and increases reliability by forming a core-shell structure in the dielectric composition, and when the content thereof is out of the range of 0.0 to 20 at % based on 100 mol % of the dielectric base main component, it is not preferred due to a reduction in dielectric constant.

Further, the dielectric composition in accordance with the present invention may include a sixth accessory component including Si and Al elements, oxides thereof, carbonates thereof, and glass including a Si element in an amount of 0 to 3.0 at % based on 100 mol % of the dielectric base main component.

The sixth accessory component performs a role of a sintering additive in the dielectric composition, and when the content thereof is out of the range of 0.0 to 3.0 at % based on 100 mol % of the dielectric base main component, it is not preferred due to deterioration of sinterability and density and generation of a secondary phase.

The dielectric composition in accordance with the present invention satisfies X5R or X7R standards.

Further, in accordance with another preferable embodiment of the present invention, a multilayer ceramic capacitor formed by alternately laminating a dielectric layer using the above dielectric composition and an internal electrode layer is provided.

It is preferred that the thickness of the dielectric layer is greater than 0.1 μm after firing, and it is recommended that the dielectric layer has a thickness of greater than 0.1 μm since an active layer having a too small thickness has a small number of crystal grains in one layer.

In accordance with an embodiment of the present invention, the dielectric layer may use a dielectric composition including a base main component including Ba and Ti and an accessory component, wherein the dielectric composition has a ratio of domain width/grain size in the range of 0 to 0.2, and the main component and the accessory component of the dielectric composition are the same as described in detail above.

Further, in accordance with another embodiment of the present invention, the dielectric layer may use a dielectric composition including a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio (Ba/Si) of the content of the fourth accessory component Ba to the content of the sixth accessory component Si is y, the relationship between x and y is in the range of upper and lower straight boundaries based on a dotted line y=1.2−0.64x of FIG. 1.

Further, preferably, the internal electrode layer may be made of nickel or nickel alloys.

Additionally, the present invention may provide a method for manufacturing a multilayer ceramic capacitor, which specifically includes the steps of printing an internal electrode layer on a dielectric sheet and laminating the dielectric sheets, firing a chip formed by cutting the laminated sheets, reoxidizing the fired chip, applying an external electrode on the fired chip, firing the external electrode, and manufacturing a completed chip by plating the fired external electrode.

In accordance with an embodiment of the present invention, the dielectric sheet may use a dielectric composition including a base main component including Ba and Ti and an accessory component, wherein the dielectric composition has a ratio of domain width/grain size in the range of 0 to 0.2.

Further, in accordance with another embodiment of the present invention, the dielectric sheet may use a dielectric composition including a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio (Ba/Si) of the content of the fourth accessory component Ba to the content of the sixth accessory component Si is y, the relationship between x and y is in the range of upper and lower straight boundaries based on a dotted line y=1.2−0.64x of FIG. 1.

The internal electrode layer may be made of nickel or nickel alloys.

The firing may be performed in a reducing atmosphere at 1100 to 1250° C., preferably below 1260° C.

Further, it is preferred that the reoxidation is a heat treatment in a $N_2$ atmosphere at 900 to 1100° C.

The present invention can increase a dielectric constant by reducing the domain size in the dielectric layer through the reoxidation process.

Further, in accordance with another embodiment of the present invention, a method for manufacturing a multilayer ceramic capacitor, which includes the steps of printing an internal electrode layer on a dielectric sheet and laminating the dielectric sheets, firing a chip formed by cutting the laminated sheets, applying an external electrode on the fired chip, firing the external electrode, manufacturing a completed chip by plating the fired external electrode, pressing the completed chip in the conditions of 150 to 250° C. and 0 to 10 MPa, and cooling the pressed chip to room temperature.

That is, according to the above method, it is possible to increase a dielectric constant by repeating the process of pressing the fired chip at predetermined temperature and pressure and cooling the pressed chip to reduce the domain size in the dielectric layer.

In accordance with an embodiment of the present invention, the dielectric sheet may use a dielectric composition including a base main component including Ba and Ti and an accessory component, wherein the dielectric composition has a ratio of domain width/grain size in the range of 0 to 0.2.

Further, in accordance with another embodiment of the present invention, the dielectric sheet may use a dielectric composition including a base main component and an accessory component, wherein the accessory component includes a first accessory component including one or more variable-valence acceptor elements selected from the group consisting of Mn, V, Cr, Fe, Ni, Co, Cu, and Zn, oxides thereof, and carbonates thereof; one or more second accessory components selected from the group consisting of fixed-valence acceptor elements of Mg and Al, oxides thereof, and carbonates thereof; a third accessory component including one or more rare-earth elements selected from the group consisting of Y, Dy, Ho, Er, Gd, Ce, Nd, and Sm, oxides thereof, and carbonates thereof; a fourth accessory component including a Ba element, oxides thereof, and carbonates thereof; a fifth component including Ca and Zr elements, oxides thereof, and carbonates thereof; and a sixth accessory component including Si and Al elements, oxides thereof, carbonates thereof, and glass including a Si element, and when the content of the second accessory component Mg is x and a ratio (Ba/Si) of the content of the fourth accessory component Ba to the content of the sixth accessory component Si is y, the relationship between x and y is in the range of upper and lower straight boundaries based on a dotted line y=1.2−0.64x of FIG. 1.

The internal electrode layer may be made of nickel or nickel alloys.

The firing may be performed in a reducing atmosphere at 1100 to 1250° C., preferably below 1250° C.

The dielectric composition of the present invention can be used in all the required dielectric products, for example, a multilayer ceramic MLCC, a piezoelectric element, a chip inductor, a chip varistor, and a chip resistor.

Particularly, the dielectric composition of the present invention can be used in multilayer dielectric products formed by alternately laminating an internal electrode layer, for example, a Ni or Ni alloy internal electrode layer, and a dielectric layer.

Hereinafter, preferred embodiments of the present invention will be described in detail. The following embodiments merely illustrate the present invention, and it should not be interpreted that the scope of the present invention is limited to the following embodiments. Further, although certain compounds are used in the following embodiments, it is apparent to those skilled in the art that equal or similar effects are shown even when using their equivalents.

Embodiment 1

A ceramic sheet is manufactured by mixing a binder after mixing components with a dispersant using ethanol and toluene as solvents according to the composition specified in Table 1. In the embodiment 1, Mg is used as a second accessory component, and the content of Mg is 0%.

$BaTiO_3$ powder having an average particle size of 150 nm is used as the main component base. Raw powder including the main component and the accessory components is ball-milled for 20 hours after being mixed with ethanol/toluene, a dispersant, and a binder using a zirconia ball as a mixing/dispersion medium. The prepared slurry is molded into a sheet having a thickness of 3.5 μm and 10 to 13 μm using a doctor blade type coater.

The molded ceramic sheets having Ni electrodes printed thereon are laminated, pressed, and cut into chips, and the cut chip is plasticized for debinding and fired at 1100 to 1250° C. to evaluate capacity, DF, TCC, and resistance degradation behavior according to an increase in voltage step at a high temperature of 150° C. Top and bottom covers are manufactured by laminating cover sheets (having a thickness of 10 to 13 μm) to 25 layers, and a bar is manufactured by laminating printed active sheets of 21 layers while pressing the sheets. The pressed bar is cut into chips having a size of 3.2 mm×1.6 mm using a cutter.

The completed MLCC chip having a size of 3.2 mm×16 mm is plasticized, fired for 2 hours in a reducing atmosphere 0.1% $H_2$/99.9% $N_2$ ($H_2O/H_2/N_2$ atmosphere) at a temperature of 1100 to 1250° C., and heat-treated for 3 hours in a $N_2$ atmosphere at 1000° C. for reoxidation. An external electrode is completed by performing a termination process using Cu paste and electrode firing on the fired chip. Accordingly, the MLCC chip having a size of 3.2 mm×1.6 mm of which a grain size is 170 nm after firing, a dielectric thickness is about 2.0 μm, and the number of dielectric layers is 20, is manufactured.

Experimental Example 1

Measurement of Characteristics of Proto-Type Chip

Room temperature capacitance and dielectric loss of the MLCC chip are measured in the conditions of 1 kHz and AC 0.5V/μm using an LCR meter. A dielectric constant of the MLCC chip dielectric is calculated from the capacitance, dielectric thickness, internal electrode area, and the number of layers of the MLCC chip. Room temperature insulation resistance is measured after 60 seconds in a state in which every 10 samples are taken and DC 10V/μm is applied.

A change in capacitance according to the temperature is measured in the temperature range of −55° C. to 145° C. A high temperature IR boosting test measures resistance degradation behavior while increasing a voltage step by 10V/μm at 150° C., wherein the time of each step is 10 minutes and the resistance value is measured by 5-second intervals. A high temperature withstand voltage is derived from the high temperature IR boosting test. The high temperature withstand voltage means a voltage at which IR withstands $10^5 \Omega$ or more when the high temperature withstand voltage is measured by applying the voltage step of DC 5V/μm at 150° C. to the chip, which has a size of 3.2 mm×1.6 mm and a dielectric of 20 layers with a thickness of 2 μm after firing, for 10 minutes and continuously increasing the voltage step. An RC value is a product of the room temperature capacitance value measured at AC 0.5V/μm and 1 kHz and the insulation resistance value measured at DC 10V/μm.

The evaluation results of physical properties of the chip according to the embodiment 1 are shown in Table 2.

TABLE 1

| | The number of moles of each additive per 100 moles of base $BaTiO_3$ | | | | | | | | |
|---|---|---|---|---|---|---|---|---|---|
| Sample | First accessory component | Second accessory component | Third accessory component | Fourth accessory component | Fifth accessory component | | Sixth accessory component | | Ba/Si ratio |
| No. | $MnO_2$ | $V_2O_5$ | $MgCO_3$ | $Y_2O_3$ | $BaCO_3$ | Ca | Zr | $Al_2O_3$ | $SiO_2$ | |
| 1 | 0.200 | 0.100 | 0.00 | 0.30 | 0.00 | 1.00 | 1.00 | 0.20 | 1.25 | 0.00 |
| 2 | 0.200 | 0.100 | 0.00 | 0.30 | 0.40 | 1.00 | 1.00 | 0.20 | 1.25 | 0.32 |
| 3 | 0.200 | 0.100 | 0.00 | 0.30 | 0.80 | 1.00 | 1.00 | 0.20 | 1.25 | 0.64 |
| 4 | 0.200 | 0.100 | 0.00 | 0.30 | 1.20 | 1.00 | 1.00 | 0.20 | 1.25 | 0.96 |
| 5 | 0.200 | 0.100 | 0.00 | 0.30 | 1.40 | 1.00 | 1.00 | 0.20 | 1.25 | 1.12 |
| 6 | 0.200 | 0.100 | 0.00 | 0.30 | 1.60 | 1.00 | 1.00 | 0.20 | 1.25 | 1.28 |
| 7 | 0.200 | 0.100 | 0.00 | 0.30 | 1.80 | 1.00 | 1.00 | 0.20 | 1.25 | 1.44 |
| 8 | 0.200 | 0.100 | 0.00 | 0.30 | 2.00 | 1.00 | 1.00 | 0.20 | 1.25 | 1.60 |
| 9 | 0.200 | 0.100 | 0.00 | 0.30 | 2.20 | 1.00 | 1.00 | 0.20 | 1.25 | 1.76 |
| 10 | 0.200 | 0.100 | 0.00 | 0.30 | 2.40 | 1.00 | 1.00 | 0.20 | 1.25 | 1.92 |
| 11 | 0.200 | 0.100 | 0.00 | 0.00 | 1.60 | 1.00 | 1.00 | 0.20 | 1.25 | 1.28 |
| 12 | 0.200 | 0.100 | 0.00 | 0.15 | 1.60 | 1.00 | 1.00 | 0.20 | 1.25 | 1.28 |
| 13 | 0.200 | 0.100 | 0.00 | 0.50 | 1.60 | 1.00 | 1.00 | 0.20 | 1.25 | 1.28 |
| 14 | 0.200 | 0.100 | 0.00 | 1.00 | 1.60 | 1.00 | 1.00 | 0.20 | 1.25 | 1.28 |
| 15 | 0.200 | 0.100 | 0.00 | 2.00 | 1.60 | 1.00 | 1.00 | 0.20 | 1.25 | 1.28 |
| 16 | 0.050 | 0.025 | 0.00 | 0.30 | 1.60 | 1.00 | 1.00 | 0.20 | 1.25 | 1.28 |
| 17 | 1.000 | 0.500 | 0.00 | 0.30 | 1.60 | 1.00 | 1.00 | 0.20 | 1.25 | 1.28 |
| 18 | 0.200 | 0.100 | 0.00 | 0.30 | 1.60 | 0.00 | 0.00 | 0.20 | 1.25 | 1.28 |
| 19 | 0.200 | 0.100 | 0.00 | 0.30 | 1.60 | 10.00 | 10.00 | 0.20 | 1.25 | 1.28 |

TABLE 2

| | Characteristics of Proto-type chip | | | | | | Evaluation of characteristics | |
| --- | --- | --- | --- | --- | --- | --- | --- | --- |
| Sample No. | Domain width/ Grain size | Dielectric constant | DF(%) | RC(WF) | TCC(%) (85° C.) | TCC(%) (125° C.) | High temperature withstand voltage (V/mm)* | Dielectric constant ○: good X: bad r: average | High temperature withstand voltage ○: good X: bad r: average |
| 1  | 0.213 | 2633 | 4.55 | 3124 | −8.5% | −18.5% | 60 | X | ○ |
| 2  | 0.207 | 2752 | 5.12 | 3325 | −8.2% | −22.4% | 60 | X | ○ |
| 3  | 0.200 | 3000 | 5.47 | 3007 | −7.8% | −19.5% | 60 | r | ○ |
| 4  | 0.150 | 3128 | 6.11 | 3457 | −6.5% | −19.1% | 60 | ○ | ○ |
| 5  | 0.080 | 3611 | 6.58 | 2955 | −7.7% | −21.4% | 60 | ○ | ○ |
| 6  | 0.042 | 4112 | 6.61 | 3287 | −8.4% | −22.0% | 65 | ○ | ○ |
| 7  | 0.120 | 3596 | 6.28 | 2845 | −8.7% | −24.5% | 60 | ○ | ○ |
| 8  | 0.160 | 3174 | 6.00 | 3250 | −6.8% | −19.5% | 65 | ○ | ○ |
| 9  | 0.240 | 2422 | 5.77 | 2963 | −6.1% | −21.4% | 60 | X | ○ |
| 10 | 0.260 | 2084 | 5.62 | 2885 | −7.8% | −25.4% | 55 | X | ○ |
| 11 | 0.078 | 3745 | 6.65 | 2789 | −7.2% | −22.2% | 50 | ○ | ○ |
| 12 | 0.071 | 3842 | 6.12 | 2856 | −9.5% | −19.4% | 60 | ○ | ○ |
| 13 | 0.079 | 3723 | 6.58 | 2936 | −8.8% | −20.3% | 55 | ○ | ○ |
| 14 | 0.160 | 3001 | 6.03 | 3001 | −7.6% | −20.4% | 40 | ○ | ○ |
| 15 | 0.210 | 2845 | 5.74 | 3455 | −8.1% | −19.7% | 30 | X | r |
| 16 | 0.038 | 4241 | 8.03 | 3287 | −8.3% | −19.6% | 30 | ○ | r |
| 17 | 0.203 | 2845 | 4.56 | 4896 | −7.1% | −15.4% | 75 | X | ○ |
| 18 | 0.060 | 3748 | 5.97 | 3216 | −7.8% | −18.6% | 55 | ○ | ○ |
| 19 | 0.150 | 3024 | 4.88 | 3687 | −8.1% | −19.5% | 60 | r | ○ |

As in the results of Table 2, in the samples No. 1 to 10, it can be checked that the dielectric constant is increased according to an increase in the Ba/Si ratio, which is a ratio of the content of the fourth accessory component Ba to the content of the sixth accessory component Si, in a state in which the remaining components are fixed.

Particularly, when the Ba/Si ratio of the sample No. 6 is 1.28, the ratio of domain width/grain size is very low as 0.042 and the dielectric constant shows a highest value as 4112, and the dielectric constant is reduced again when the Ba/Si ratio is further increased.

However, when the Ba/Si ratio is less than 0.64 (sample No. 3) or greater than 1.76 (sample No. 9), the ratio of domain width/grain size is increased to greater than 0.2 and the dielectric constant is reduced to less than 3000.

Therefore, when the content of the second accessory component Mg is 0 at %, if the Ba/Si ratio is in the range of 0.96 to 1.60, the ratio of domain width/grain size is reduced and the high dielectric constant is implemented. And in this composition range, the high temperature withstand characteristics are good as higher than 60V/μm.

Further, the sample No. 6 and the samples No. 11 to 15 in Table 1 represent the compositions showing changes in the content of the third accessory component $Y_2O_3$ in the condition in which the Ba/Si ratio is 1.28 and the remaining components except the third accessory component are the same, and Table 2 shows the characteristics of the proto-type chip corresponding to the compositions.

As in Table 2, as the content of $Y_2O_3$ is increased from 0 mol, the dielectric constant is increased. When the content of $Y_2O_3$ of the sample No. 6 is 0.3 mol, the dielectric constant shows a highest value as 4112. As the content of $Y_2O_3$ is further increased, the dielectric constant is reduced again. When the content of $Y_2O_3$ is 2 mol, the dielectric constant is reduced to about 2945.

When the content of $Y_2O_3$ is 0.15 to 0.3 mol, the high temperature withstand voltage characteristics are good as about 60 to 65V/μm, and when the content is increased or reduced, the withstand voltage level is also reduced. Therefore, the high dielectric constant is implemented and the high temperature voltage characteristics are good when the content of $Y_2O_3$ is in the range of 0 to 2.0 mol.

Further, in case of the sample No. 16 of which the content of the first accessory component is small, the high temperature withstand voltage characteristics are low as 30V/μm, and when the content of the first accessory component is too excessive like the sample No. 17, the dielectric constant is reduced to less than 3000. Therefore, the high dielectric constant is implemented and the high temperature withstand voltage characteristics are good when the content of the first accessory component is 0.1 at % (corresponding to $MnO_2$: 0.05 mol, $V_2O_5$: 0.025 mol) to 2 at % (corresponding to $MnO_2$: 1.0 mol, $V_2O_5$: 0.5 mol) based on $BaTiO_3$.

Further, in the sample No. 19 of which the content of the fifth accessory component is excessive, the dielectric constant is reduced to about 3024. Therefore, the high dielectric constant is implemented and the high temperature withstand voltage characteristics are good when the content of the fifth accessory component is 0 to 20 mol based on $BaTiO_3$.

And, it can be checked that all the samples shown in Table 2 can satisfy X5R standards since 85° C. TCC is less than ±15% in the measurement condition in which a high AC electric field of AC 0.5V/μm is applied.

Experimental Example 2

Identification of Microstructure

A microstructure of a domain is observed by transmission electron microscopy (TEM) images as in FIGS. 3 and 4, and a ratio of the average length of width of a parallel band pattern shown in a crystal grain to the size of the crystal grain is calculated as a ratio of domain width/grain size.

FIG. 3 is a domain shape of a crystal grain of a sample No. 36 in the embodiment 3. When the Ba/Si ratio is greater than 1.44, the ratio of domain width/grain size is increased to greater than 0.20, and at this time, the dielectric constant is reduced to less than 3000.

Further, FIG. 4 is a domain shape of a crystal grain of a sample No. 32 in the embodiment 3. When the Ba/Si ratio is 0.64, the ratio of domain width/grain size is very low as 0.041, and at this time, the dielectric constant shows a highest value as 4224.

From these results, therefore, when the content of the second accessory component Mg is 1.0 at %, if the Ba/Si ratio is in the range of 0 to 1.44, the ratio of domain width/grain size is reduced and the high dielectric constant is implemented. And, in this composition range, the high temperature withstand voltage characteristics are good as higher than 60V/μm.

Embodiment 2

According to the compositions of Table 3, MLCC chips are manufactured by the same process as the embodiment 1. Particularly, Table 3 shows exemplary compositions when the content of the second accessory component Mg is 0.5%. Further, physical properties of the MLCC chips of the manufactured samples are measured by the same process as the experimental example 1, and the results thereof are shown in Table 4.

As in the results of Table 4, in the samples No. 20 to 29, the dielectric constant is increased according to an increase in the Ba/Si ratio, which is a ratio of the content of the fourth accessory component Ba to the content of the sixth accessory component Si, from 0 in a state in which the remaining components are fixed. When the Ba/Si ratio of the sample No. 23 is 0.96, the ratio of domain width/grain size is very low as 0.044 and the dielectric constant shows a highest value as 4005, and when the Ba/Si ratio is further increased, the dielectric constant is reduced again.

However, when the Ba/Si ratio is 0 (sample No. 1) or greater than 1.6 (sample No. 27), the ratio of domain width/grain size is increased to greater than 0.20 and the dielectric constant is reduced to less than 3000.

Therefore, when the content of the second accessory component Mg is 0.5 at %, if the Ba/Si ratio is in the range of 0.32 to 1.44, the ratio of domain width/grain size is reduced and the high dielectric constant is implemented. And, in this composition range, the high temperature withstand voltage characteristics are good as higher than 60V/μm.

TABLE 3

| | The number of moles of each additive per 100 moles of base $BaTiO_3$ | | | | | | | | |
|---|---|---|---|---|---|---|---|---|---|
| Sample No. | First accessory component | | Second accessory component | Third accessory component | Fourth accessory component | Fifth accessory component | | Sixth accessory component | | Ba/Si ratio |
| | $MnO_2$ | $V_2O_5$ | $MgCO_3$ | $Y_2O_3$ | $BaCO_3$ | Ca | Zr | $Al_2O_3$ | $SiO_2$ | |
| 20 | 0.200 | 0.100 | 0.50 | 0.30 | 0.00 | 1.00 | 1.00 | 0.20 | 1.25 | 0.00 |
| 21 | 0.200 | 0.100 | 0.50 | 0.30 | 0.40 | 1.00 | 1.00 | 0.20 | 1.25 | 0.32 |
| 22 | 0.200 | 0.100 | 0.50 | 0.30 | 0.80 | 1.00 | 1.00 | 0.20 | 1.25 | 0.64 |
| 23 | 0.200 | 0.100 | 0.50 | 0.30 | 1.20 | 1.00 | 1.00 | 0.20 | 1.25 | 0.96 |
| 24 | 0.200 | 0.100 | 0.50 | 0.30 | 1.40 | 1.00 | 1.00 | 0.20 | 1.25 | 1.12 |
| 25 | 0.200 | 0.100 | 0.50 | 0.30 | 1.60 | 1.00 | 1.00 | 0.20 | 1.25 | 1.28 |
| 26 | 0.200 | 0.100 | 0.50 | 0.30 | 1.80 | 1.00 | 1.00 | 0.20 | 1.25 | 1.44 |
| 27 | 0.200 | 0.100 | 0.50 | 0.30 | 2.00 | 1.00 | 1.00 | 0.20 | 1.25 | 1.60 |
| 28 | 0.200 | 0.100 | 0.50 | 0.30 | 2.20 | 1.00 | 1.00 | 0.20 | 1.25 | 1.76 |
| 29 | 0.200 | 0.100 | 0.50 | 0.30 | 2.40 | 1.00 | 1.00 | 0.20 | 1.25 | 1.92 |

TABLE 4

| | Characteristics of proto-type chip | | | | | | | Evaluation of characteristics | |
|---|---|---|---|---|---|---|---|---|---|
| Sample No. | Domain width/ grain size | Dielectric constant | DF (%) | RC (WF) | TCC (%) (85° C.) | TCC (%) (125° C.) | High temperature withstand voltage (V/mm)* | Dielectric constant ○: good X: bad r: average | High temperature withstand voltage ○: good X: bad r: average |
| 20 | 0.215 | 2806 | 5.64 | 3125 | −8.1% | −26.5% | 60 | X | ○ |
| 21 | 0.117 | 3455 | 5.90 | 3364 | −8.2% | −22.4% | 60 | ○ | ○ |
| 22 | 0.070 | 3842 | 6.42 | 3458 | −8.8% | −19.5% | 65 | ○ | ○ |
| 23 | 0.044 | 4005 | 6.50 | 3697 | −6.5% | −19.1% | 65 | ○ | ○ |
| 24 | 0.068 | 3812 | 6.42 | 3285 | −7.7% | −21.4% | 65 | ○ | ○ |
| 25 | 0.144 | 3225 | 5.84 | 2947 | −8.4% | −22.0% | 60 | ○ | ○ |
| 26 | 0.195 | 2964 | 5.69 | 3145 | −8.7% | −24.5% | 55 | ○ | ○ |
| 27 | 0.220 | 2456 | 5.23 | 3546 | −5.9% | −19.5% | 55 | X | ○ |
| 28 | 0.260 | 2187 | 5.17 | 3110 | −6.1% | −21.4% | 55 | X | ○ |
| 29 | 0.301 | 1964 | 4.84 | 2945 | −7.8% | −25.4% | 50 | X | ○ |

Further, it can be checked that all the samples in Table 3 satisfy X5R standards since 85° C. TCC is less than ±15% in the measurement condition in which a high AC electric field of AC 0.5V/μm is applied.

Embodiment 3

According to the compositions of Table 5, MLCC chips are manufactured by the same process as the embodiment 1. Particularly, Table 5 shows exemplary compositions when the content of the second accessory component $MgCO_3$ is 1.0 mol based on 100 mol of $BaTiO_3$. Further, physical properties of the MLCC chips of the manufactured samples are measured by the same process as the experimental example 1, and the results thereof are shown in Table 6.

When the Ba/Si ratio is greater than 1.44 (sample No. 36), the ratio of domain width/grain size is increased to greater than 0.20 and the dielectric constant is reduced to less than 3000.

Therefore, when the content of the second accessory component Mg is 1.0 at %, if the Ba/Si ratio is in the range of 0 to 1.44, the ratio of domain width/grain size is reduced and the high dielectric constant is implemented. And, in this composition range, the high temperature withstand voltage characteristics are good as higher than 60V/μm.

Further, it can be checked that all the samples in Table 5 satisfy X5R standards since 85° C. TCC is less than ±15% in the measurement condition in which a high AC electric field of AC 0.5V/μm is applied.

TABLE 5

| | The number of moles of each additive per 100 moles of base $BaTiO_3$ | | | | | | | | |
|---|---|---|---|---|---|---|---|---|---|
| Sample No. | First accessory component $MnO_2$ | Second accessory component $V_2O_5$ | Third accessory component $MgCO_3$ | Fourth accessory component $Y_2O_3$ | Fifth accessory component $BaCO_3$ | Fifth accessory component Ca | Fifth accessory component Zr | Sixth accessory component $Al_2O_3$ | Sixth accessory component $SiO_2$ | Ba/Si ratio |
| 30 | 0.200 | 0.100 | 0.10 | 0.30 | 0.00 | 1.00 | 1.00 | 0.20 | 1.25 | 0.00 |
| 31 | 0.200 | 0.100 | 0.10 | 0.30 | 0.40 | 1.00 | 1.00 | 0.20 | 1.25 | 0.32 |
| 32 | 0.200 | 0.100 | 0.10 | 0.30 | 0.80 | 1.00 | 1.00 | 0.20 | 1.25 | 0.64 |
| 33 | 0.200 | 0.100 | 0.10 | 0.30 | 1.20 | 1.00 | 1.00 | 0.20 | 1.25 | 0.96 |
| 34 | 0.200 | 0.100 | 0.10 | 0.30 | 1.40 | 1.00 | 1.00 | 0.20 | 1.25 | 1.12 |
| 35 | 0.200 | 0.100 | 0.10 | 0.30 | 1.60 | 1.00 | 1.00 | 0.20 | 1.25 | 1.28 |
| 36 | 0.200 | 0.100 | 0.10 | 0.30 | 1.80 | 1.00 | 1.00 | 0.20 | 1.25 | 1.44 |
| 37 | 0.200 | 0.100 | 0.10 | 0.30 | 2.00 | 1.00 | 1.00 | 0.20 | 1.25 | 1.60 |
| 38 | 0.200 | 0.100 | 0.10 | 0.30 | 2.20 | 1.00 | 1.00 | 0.20 | 1.25 | 1.76 |
| 39 | 0.200 | 0.100 | 0.10 | 0.30 | 2.40 | 1.00 | 1.00 | 0.20 | 1.25 | 1.92 |

TABLE 6

| | Characteristics of proto-type chip | | | | | | | Evaluation of characteristics | |
|---|---|---|---|---|---|---|---|---|---|
| Sample No. | Domain width/ grain size | Dielectric constant | DF (%) | RC (WF) | TCC (%) (85° C.) | TCC (%) (125° C.) | High temperature withstand voltage (V/mm)* | Dielectric constant ○: good X: bad r: average | High temperature withstand voltage ○: good X: bad r: average |
| 30 | 0.158 | 3110 | 6.07 | 3325 | −9.3% | −22.7% | 55 | ○ | ○ |
| 31 | 0.068 | 3865 | 6.12 | 3126 | −9.4% | −22.6% | 65 | ○ | ○ |
| 32 | 0.041 | 4224 | 6.67 | 3478 | −9.0% | −21.5% | 60 | ○ | ○ |
| 33 | 0.057 | 3965 | 6.54 | 2986 | −9.7% | −19.8% | 60 | ○ | ○ |
| 34 | 0.111 | 3502 | 6.38 | 3478 | −9.4% | −20.8% | 60 | ○ | ○ |
| 35 | 0.155 | 3129 | 5.98 | 2988 | −9.6% | −20.7% | 55 | ○ | ○ |
| 36 | 0.203 | 2968 | 5.64 | 3325 | −8.7% | −21.8% | 55 | r | ○ |
| 37 | 0.235 | 2456 | 5.12 | 3250 | −8.6% | −22.4% | 50 | X | ○ |
| 38 | 0.288 | 2006 | 4.87 | 3125 | −8.1% | −22.5% | 50 | X | ○ |
| 39 | 0.302 | 1847 | 4.25 | 2745 | −8.4% | −21.7% | 45 | X | ○ |

As in the results of Table 6, in the samples No. 30 to 39, the dielectric constant is increased according to an increase in the Ba/Si ratio, which is a ratio of the content of the fourth accessory component Ba to the content of the sixth accessory component Si, from 0 in a state in which the remaining components are fixed. When the Ba/Si ratio of the sample No. 32 is 0.64, the ratio of domain width/grain size is very low as 0.041 and the dielectric constant shows a highest value as 4224, and when the Ba/Si ratio is further increased, the dielectric constant is reduced again.

Embodiment 4

According to the compositions of Table 7, MLCC chips are manufactured by the same process as the embodiment 1. Particularly, Table 7 shows exemplary compositions when the content of the second accessory component $MgCO_3$ is 1.5 mol based on 100 mol of $BaTiO_3$. Further, physical properties of the MLCC chips of the manufactured samples are measured by the same process as the experimental example 1, and the results thereof are shown in Table 8.

TABLE 7

| | The number of moles of each additive per 100 moles of base BaTiO₃ | | | | | | | | |
|---|---|---|---|---|---|---|---|---|---|
| | First accessory component | Second accessory component | Third accessory component | Fourth accessory component | Fifth accessory component | | Sixth accessory component | | Ba/Si |
| Sample No. | MnO₂  V₂O₅ | MgCO₃ | Y₂O₃ | BaCO₃ | Ca | Zr | Al₂O₃ | SiO₂ | ratio |
| 40 | 0.200  0.100 | 1.50 | 0.30 | 0.00 | 1.00 | 1.00 | 0.20 | 1.25 | 0.00 |
| 41 | 0.200  0.100 | 1.50 | 0.30 | 0.40 | 1.00 | 1.00 | 0.20 | 1.25 | 0.32 |
| 42 | 0.200  0.100 | 1.50 | 0.30 | 0.80 | 1.00 | 1.00 | 0.20 | 1.25 | 0.64 |
| 43 | 0.200  0.100 | 1.50 | 0.30 | 1.20 | 1.00 | 1.00 | 0.20 | 1.25 | 0.96 |
| 44 | 0.200  0.100 | 1.50 | 0.30 | 1.40 | 1.00 | 1.00 | 0.20 | 1.25 | 1.12 |
| 45 | 0.200  0.100 | 1.50 | 0.30 | 1.60 | 1.00 | 1.00 | 0.20 | 1.25 | 1.28 |
| 46 | 0.200  0.100 | 1.50 | 0.30 | 1.80 | 1.00 | 1.00 | 0.20 | 1.25 | 1.44 |
| 47 | 0.200  0.100 | 1.50 | 0.30 | 2.00 | 1.00 | 1.00 | 0.20 | 1.25 | 1.60 |
| 48 | 0.200  0.100 | 1.50 | 0.30 | 2.20 | 1.00 | 1.00 | 0.20 | 1.25 | 1.76 |
| 49 | 0.200  0.100 | 1.50 | 0.30 | 2.40 | 1.00 | 1.00 | 0.20 | 1.25 | 1.92 |

TABLE 8

| | Characteristics of proto-type chip | | | | | | Evaluation of characteristics | |
|---|---|---|---|---|---|---|---|---|
| Sample No. | Domain width/ grain size | Dielectric constant | DF (%) | RC (WF) | TCC (%) (85° C.) | TCC (%) (125° C.) | High temperature withstand voltage (V/mm)* | Dielectric constant ○: good X: bad r: average | High temperature withstand voltage ○: good X: bad r: average |
| 40 | 0.112 | 3496 | 6.23 | 3125 | −9.5% | −21.4% | 60 | ○ | ○ |
| 41 | 0.041 | 3845 | 6.48 | 3623 | −9.6% | −22.5% | 60 | ○ | ○ |
| 42 | 0.141 | 3254 | 6.15 | 3425 | −9.4% | −22.7% | 60 | ○ | ○ |
| 43 | 0.168 | 3025 | 5.98 | 3002 | −9.2% | −20.8% | 55 | ○ | ○ |
| 44 | 0.200 | 2875 | 5.64 | 2975 | −8.7% | −20.4% | 55 | r | ○ |
| 45 | 0.222 | 2563 | 5.23 | 2849 | −9.8% | −19.4% | 55 | X | ○ |
| 46 | 0.247 | 2354 | 5.21 | 2968 | −9.3% | −19.2% | 55 | X | ○ |
| 47 | 0.278 | 2087 | 4.99 | 3046 | −8.8% | −20.8% | 50 | X | ○ |
| 48 | 0.291 | 1978 | 4.87 | 3214 | −9.3% | −20.3% | 50 | X | ○ |
| 49 | 0.302 | 1882 | 4.56 | 2681 | −8.5% | −20.6% | 45 | X | ○ |

As in the results of Table 8, in the samples No. 40 to 49, when the Ba/Si ratio of the content of the fourth accessory component Ba to the content of the sixth accessory component Si of the sample No. 41 is 0.32 in a state in which the remaining components are fixed, the ratio of domain width/grain size is very low as 0.041 and the dielectric constant shows a highest value as 3845, and when the Ba/Si ratio is further increased, the dielectric constant is reduced again.

However, when the Ba/Si ratio is greater than 1.12 (sample No. 44), the ratio of domain width/grain size is increased to greater than 0.20 and the dielectric constant is reduced to less than 3000.

Therefore, when the content of the second accessory component Mg is 1.5 at %, if the Ba/Si ratio is in the range of 0 to 0.96, the ratio of domain width/grain size is reduced and the high dielectric constant is implemented. And, in this composition range, the high temperature withstand voltage characteristics are good as higher than 60V/μm.

Further, it can be checked that all the samples in Table 7 satisfy X5R standards since 85° C. TCC is less than ±15% in the measurement condition in which a high AC electric field of AC 0.5V/μm is applied.

Embodiment 5

According to the compositions of Table 9, MLCC chips are manufactured by the same process as the embodiment 1. Particularly, Table 9 shows exemplary compositions when the content of the second accessory component MgCO₃ is 2.0 mol based on 100 mol of BaTiO₃. Further, physical properties of the MLCC chips of the manufactured samples are measured by the same process as the experimental example 1, and the results thereof are shown in Table 10.

TABLE 9

The number of moles of each additive per 100 moles of base $BaTiO_3$

| Sample No. | First accessory component $MnO_2$ | | Second accessory component $MgCO_3$ | Third accessory component $Y_2O_3$ | Fourth accessory component $BaCO_3$ | Fifth accessory component | | Sixth accessory component | | Ba/Si ratio |
|---|---|---|---|---|---|---|---|---|---|---|
| | $MnO_2$ | $V_2O_5$ | $MgCO_3$ | $Y_2O_3$ | $BaCO_3$ | Ca | Zr | $Al_2O_3$ | $SiO_2$ | |
| 50 | 0.200 | 0.100 | 2.00 | 0.30 | 0.00 | 1.00 | 1.00 | 0.20 | 1.25 | 0.00 |
| 51 | 0.200 | 0.100 | 2.00 | 0.30 | 0.40 | 1.00 | 1.00 | 0.20 | 1.25 | 0.32 |
| 52 | 0.200 | 0.100 | 2.00 | 0.30 | 0.80 | 1.00 | 1.00 | 0.20 | 1.25 | 0.62 |
| 53 | 0.200 | 0.100 | 2.00 | 0.30 | 1.20 | 1.00 | 1.00 | 0.20 | 1.25 | 0.96 |
| 54 | 0.200 | 0.100 | 2.00 | 0.30 | 1.40 | 1.00 | 1.00 | 0.20 | 1.25 | 1.12 |
| 55 | 0.200 | 0.100 | 2.00 | 0.30 | 1.60 | 1.00 | 1.00 | 0.20 | 1.25 | 1.28 |
| 56 | 0.200 | 0.100 | 2.00 | 0.30 | 1.80 | 1.00 | 1.00 | 0.20 | 1.25 | 1.44 |
| 57 | 0.200 | 0.100 | 2.00 | 0.30 | 2.00 | 1.00 | 1.00 | 0.20 | 1.25 | 1.60 |
| 58 | 0.200 | 0.100 | 2.00 | 0.30 | 2.20 | 1.00 | 1.00 | 0.20 | 1.25 | 1.76 |
| 59 | 0.200 | 0.100 | 2.00 | 0.30 | 2.40 | 1.00 | 1.00 | 0.20 | 1.25 | 1.92 |

TABLE 10

| | Characteristics of proto-type chip | | | | | | | Evaluation of characteristics | |
|---|---|---|---|---|---|---|---|---|---|
| Sample No. | Domain width/ grain size | Dielectric constant | DF (%) | RC (WF) | TCC (%) (85° C.) | TCC (%) (125° C.) | High temperature withstand voltage (V/mm)* | Dielectric constant ○: good X: bad r: average | High temperature withstand voltage ○: good X: bad r: average |
| 50 | 0.062 | 3605 | 6.25 | 3005 | −10.2% | −20.8% | 60 | ○ | ○ |
| 51 | 0.095 | 3428 | 6.12 | 3456 | −10.4% | −22.5% | 55 | ○ | ○ |
| 52 | 0.120 | 3133 | 5.88 | 3258 | −10.1% | −21.4% | 55 | ○ | ○ |
| 53 | 0.200 | 2964 | 5.78 | 3125 | −10.5% | −21.9% | 55 | r | ○ |
| 54 | 0.215 | 2759 | 5.63 | 2987 | −10.6% | −21.4% | 55 | X | ○ |
| 55 | 0.223 | 2544 | 5.45 | 2789 | −10.2% | −22.0% | 50 | X | ○ |
| 56 | 0.242 | 2239 | 5.53 | 3006 | −9.4% | −22.8% | 50 | X | ○ |
| 57 | 0.248 | 2078 | 4.89 | 3125 | −9.3% | −20.7% | 50 | X | ○ |
| 58 | 0.287 | 1944 | 4.77 | 3360 | −9.4% | −21.3% | 45 | X | ○ |
| 59 | 0.294 | 1869 | 4.68 | 3155 | −9.2% | −22.0% | 45 | X | ○ |

As in the results of Table 10, in the samples No. 50 to 59, when the Ba/Si ratio of the content of the fourth accessory component Ba to the content of the sixth accessory component Si of the sample No. 50 is 0 in a state in which the remaining components are fixed, the ratio of domain width/grain size is relatively low as 0.062 and the dielectric constant shows a highest value as 3605, and the dielectric constant is reduced according to an increase in the Ba/Si ratio.

However, when the Ba/Si ratio is greater than 0.96 (sample No. 53), the ratio of domain width/grain size is increased to greater than 0.20 and the dielectric constant is reduced to less than 3000.

Therefore, when the content of the second accessory component Mg is 2.0 at %, if the Ba/Si ratio is in the range of 0 to 0.64, the ratio of domain width/grain size is reduced and the high dielectric constant is implemented. And, in this composition range, the high temperature withstand voltage characteristics are good as higher than 60V/μm. Further, it can be checked that all the samples in Table 9 satisfy X5R standards since 85° C. TCC is less than ±15% in the measurement condition in which a high AC electric field of AC 0.5V/μm is applied Embodiment 6

According to the compositions of Table 11, MLCC chips are manufactured by the same process as the embodiment 1. Particularly, Table 11 shows exemplary compositions when the content of the second accessory component $MgCO_3$ is 0 mol based on 100 mol of $BaTiO_3$. Further, physical properties of the MLCC chips of the manufactured samples are measured by the same process as the experimental example 1, and the results thereof are shown in Table 12.

TABLE 11

| | The number of moles of each additive per 100 moles of base BaTiO₃ | | | | | | | | |
|---|---|---|---|---|---|---|---|---|---|
| | First accessory component | Second accessory component | Third accessory component | Fourth accessory component | Fifth accessory component | | Sixth accessory component | | Ba/Si |
| Sample No. | MnO₂ | V₂O₅ | MgCO₃ | Y₂O₃ | BaCO₃ | Ca | Zr | Al₂O₃ | SiO₂ | ratio |
| 60 | 0.200 | 0.100 | 0.00 | 0.30 | 0.50 | 1.00 | 1.00 | 0.20 | 0.60 | 0.83 |
| 61 | 0.200 | 0.100 | 0.00 | 0.30 | 0.75 | 1.00 | 1.00 | 0.20 | 0.60 | 1.25 |
| 62 | 0.200 | 0.100 | 0.00 | 0.30 | 1.00 | 1.00 | 1.00 | 0.20 | 0.60 | 1.67 |
| 63 | 0.200 | 0.100 | 0.00 | 0.30 | 2.00 | 1.00 | 1.00 | 0.20 | 2.40 | 0.83 |
| 64 | 0.200 | 0.100 | 0.00 | 0.30 | 3.00 | 1.00 | 1.00 | 0.20 | 2.40 | 1.25 |
| 65 | 0.200 | 0.100 | 0.00 | 0.30 | 4.00 | 1.00 | 1.00 | 0.20 | 2.40 | 1.67 |

TABLE 12

| | Characteristics of proto-type chip | | | | | | | Evaluation of characteristics | |
|---|---|---|---|---|---|---|---|---|---|
| | | | | | | | High temperature withstand voltage (V/mm)* | Dielectric constant ○: good X: bad r: average | High temperature withstand voltage ○: good X: bad r: average |
| Sample No. | Domain width/ grain size | Dielectric constant | DF (%) | RC (WF) | TCC (%) (85° C.) | TCC (%) (125° C.) | | | |
| 60 | 0.014 | 3235 | 5.67 | 3325 | −8.4% | −19.4% | 65 | ○ | ○ |
| 61 | 0.041 | 3945 | 6.45 | 3126 | −8.2% | −19.2% | 65 | ○ | ○ |
| 62 | 0.280 | 2245 | 4.89 | 3233 | −8.0% | −18.4% | 65 | X | ○ |
| 63 | 0.068 | 3412 | 5.23 | 3045 | −8.1% | −18.8% | 60 | ○ | ○ |
| 64 | 0.043 | 3951 | 6.62 | 3175 | −8.3% | −19.1% | 60 | ○ | ○ |
| 65 | 0.240 | 2045 | 4.63 | 3222 | −8.2% | −18.7% | 60 | X | ○ |

Table 11 shows an embodiment in which the Ba/Si ratio is changed when the content of the second accessory component MgCO₃ is 0 and the respective contents of the sixth accessory component SiO₂ are 0.6 mol and 2.4 in the samples 60 to 62 and the samples 63 to 65.

As in the results of Table 12, even in case that the contents of SiO₂ are 0.6 mol and 2.4 mol, when the Ba/Si ratio is 1.25 similarly to Table 1 in which the content of SiO₂ is 1.25 mol, the ratios of domain width/grain size are very low as 0.041 and 0.043 and the dielectric constants show large values as 3945 and 3951. Therefore, it can be checked that the highest dielectric constant is implemented at around specific Ba/Si ratio (that is, the Ba/Si ratio is 1.25 when the content of the second accessory component MgCO₃ is 0) regardless of the content of SiO₂.

And it can be checked that all the samples in Table 11 satisfy X5R standards since 85° C. TCC is less than ±15% in the measurement condition in which a high AC electric field of AC 0.5V/μm is applied.

From the results of the samples No. 1 to 65 of the embodiments 1 to 6, it can be checked that the Ba/Si ratios at which the ratio of domain width/grain size is very low and the highest dielectric constant is implemented are reduced to about 1.60, 0.96, 0.64, 0.32, and 0 as the contents of the second accessory component Mg are increased to 0, 0.5, 1.0, 1.5, and 2.0 mol. The range in which the high dielectric constant is implemented according to the Ba/Si ratio and the Mg content is shown in FIG. 1.

That is, when the content of the second accessory component Mg is x and the ratio Ba/Si of the content of the fourth accessory component Ba to the content of the sixth accessory component Si is y, the relationship between x and y is in the range of upper and lower straight boundaries based on a dotted line y=1.2−0.64x of FIG. 1.

Embodiment 7

A test is performed in the following conditions to look into the effect of mechanical and thermal post-treatments on electrical characteristics of a finished MLCC. A chip of the sample No. 31 of the embodiment 3 is manufactured according to the post-treatment conditions of Table 13.

Figure 2:
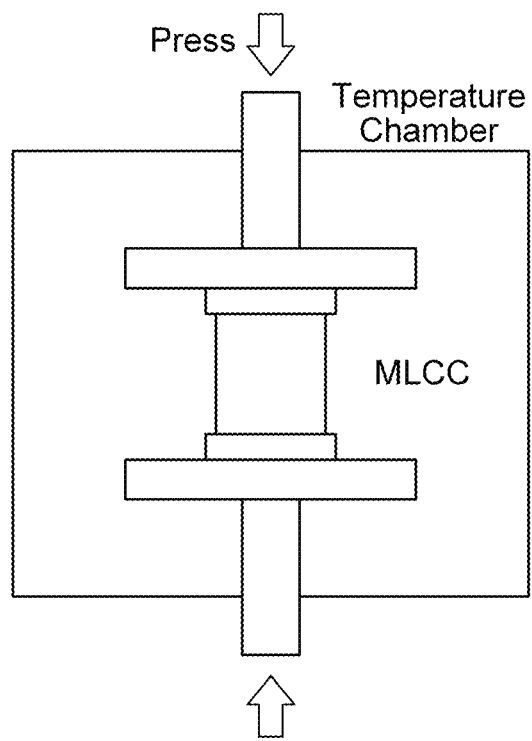
FIG. 2 is a schematic diagram of MLCC pressing heat treatment conditions.

A pressure heat treatment test is performed to test the electrical characteristics after applying pressures of 5 MPa and 10 MPa to the MLCC for 30 minutes in a temperature chamber of 150 to 200° C. and cooling the MLCC to room temperature as shown in a schematic diagram of FIG. 2.

A reoxidation heat treatment test is performed to test the electrical characteristics after repeating the process of slowly (300° C./h) or rapidly cooling the MLCC sample by maintaining the MLCC sample, which is fired before an external electrode is applied, in a N₂ atmosphere of 1000° C. for 2 hours three times.

TABLE 13

| | The number of moles of each additive per 100 moles of base BaTiO$_3$ | | | | | | | | |
|---|---|---|---|---|---|---|---|---|---|
| | First accessory component | Second accessory component | Third accessory component | Fourth accessory component | Fifth accessory component | Sixth accessory component | | | |
| Sample No. | MnO$_2$ | V$_2$O$_3$ | MgCO$_3$ | Y$_2$O$_3$ | BaCO$_3$ | Ca | Zr | Al$_2$O$_3$ | SiO$_2$ | Ba/Si ratio |
| 31 | 0.200 | 0.100 | 1.00 | 0.30 | 0.40 | 1.00 | 1.00 | 0.20 | 1.25 | 0.32 |
| 31-1 | Pressure heat treatment: 150° C. 5 MPa, cooling to room temperature after 30 minutes | | | | | | | | | |
| 31-2 | Pressure heat treatment: 200° C. 5 MPa, cooling to room temperature after 30 minutes | | | | | | | | | |
| 31-3 | Pressure heat treatment: 200° C. 10 MPa, cooling to room temperature after 30 minutes | | | | | | | | | |
| 31-4 | Reoxidation heat treatment N$_2$ atmosphere 1000° C., slow cooling (300° C.) after 2 hours: repeat three times | | | | | | | | | |
| 31-4 | Reoxidation heat treatment N$_2$ atmosphere 1000° C., rapid cooling after 2 hours: repeat three times | | | | | | | | | |

Further, the manufactured chip is maintained at 150 to 200° C. and 5 to 10 MPa for 30 minutes, cooled to room temperature, and taken from a press to measure the ratio of domain width/grain size as shown in FIG. 2, and the results of the measurement are shown in Table 14.

TABLE 14

| | Characteristics of proto-type chip | | | | | | Evaluation of characteristics | |
|---|---|---|---|---|---|---|---|---|
| Sample No. | Domain width/ grain size | Dielectric constant | DF (%) | RC (WF) | TCC (%) (85° C.) | TCC (%) (125° C.) | High temperature withstand voltage (V/mm)* | Dielectric constant ○: good X: bad r: average | High temperature withstand voltage ○: good X: bad r: average |
| 31 | 0.068 | 3685 | 6.12 | 3345 | −9.4% | −22.6% | 65 | ○ | ○ |
| 31-1 | 0.041 | 4225 | 6.78 | 3456 | −9.1% | −21.4% | 65 | ○ | ○ |
| 31-2 | 0.038 | 4307 | 7.12 | 3111 | −9.3% | −21.6% | 65 | ○ | ○ |
| 31-3 | 0.034 | 4468 | 8.12 | 3125 | −9.5% | −21.3% | 65 | ○ | ○ |
| 31-4 | 0.058 | 3950 | 6.65 | 3214 | −9.3% | −20.8% | 65 | ○ | ○ |
| 31-5 | 0.047 | 4268 | 6.98 | 3111 | −9.1% | −20.4% | 65 | ○ | ○ |

As in the results of Table 14, it can be checked that the ratios of domain width/grain size of the samples No. 31-1 to 31-3 are reduced to 0.034 to 0.041 from 0.068 and the dielectric constants thereof are increased to 4225 to 4406 from 3685.

Further, it can be checked that the higher the heat treatment temperature and the pressure, the lower the ratio of domain width/grain size and the higher the dielectric constant. The appropriate pressure may be different according to the size and structure of the MLCC sample and should be determined in the range that doesn't cause mechanical damage.

It can be checked that the ratio of domain width/grain size is reduced to 0.047 to 0.058 from 0.068 and the dielectric constant is increased to 3950 to 4268 from 3685 even when slow or rapid cooling after a reoxidation heat treatment in a N$_2$ atmosphere of 1000° C. for 2 hours is repeated three times like the samples No. 31-4 and 31-5.

Embodiment 8

A chip is manufactured according to the post-treatment conditions of Table 15 to check characteristics of a proto-type chip according to the pressure and reoxidation heat treatment conditions of the sample No. 6. The characteristics of the proto-type chip are shown in Table 16.

TABLE 15

| | The number of moles of each additive per 100 moles of base BaTiO$_3$ | | | | | | | | |
|---|---|---|---|---|---|---|---|---|---|
| | First accessory component | Second accessory component | Third accessory component | Fourth accessory component | Fifth accessory component | Sixth accessory component | | | |
| Sample No. | MnO$_2$ | V$_2$O$_3$ | MgCO$_3$ | Y$_2$O$_3$ | BaCO$_3$ | Ca | Zr | Al$_2$O$_3$ | SiO$_2$ | Ba/Si ratio |
| 6 | 0.200 | 0.100 | 0.00 | 0.30 | 1.60 | 1.00 | 1.00 | 0.20 | 1.25 | 1.28 |
| 6-1 | Reoxidation heat treatment N$_2$ atmosphere 1000° C., rapid cooling after 2 hours: repeat three times | | | | | | | | | |
| 6-2 | Pressure heat treatment on the sample 6-1: 200° C. 10 MPa, cooling to room temperature after 30 minutes | | | | | | | | | |

TABLE 16

| | Characteristics of proto-type chip | | | | | | Evaluation of characteristics | |
|---|---|---|---|---|---|---|---|---|
| | | | | | | | | High temperature |
| Sample No. | Domain width/ grain size | Dielectric constant | DF (%) | RC (WF) | TCC (%) (85° C.) | TCC (%) (125° C.) | High temperature withstand voltage (V/mm)* | Dielectric constant ○: good X: bad r: average | withstand voltage ○: good X: bad r: average |
| 6 | 0.042 | 4112 | 6.61 | 3287 | −8.4% | −22.0% | 65 | ○ | ○ |
| 6-1 | 0.031 | 4568 | 6.98 | 3111 | −8.8% | −21.2% | 65 | ○ | ○ |
| 6-2 | 0.017 | 5341 | 7.35 | 3456 | −8.9% | −22.2% | 65 | ○ | ○ |

As in the results of Table 16, it can be checked that the ratio of domain width/grain size is reduced to 0.017 to 0.031 from 0.042 and the dielectric constant is increased to 4568 to 5341 from 4112 even when rapid cooling after a reoxidation heat treatment in a $N_2$ atmosphere of 1000° C. for 2 hours or a pressure heat treatment is repeated three times like the samples No. 6-1 and 6-2.

Therefore, it can be checked that the ratio of domain width/grain size is reduced by the appropriate post-treatment conditions and thus the dielectric constant is increased.

From all the embodiments of the present invention, it can be checked that a high dielectric constant is obtained by implementing a microstructure having a low ratio of domain width/grain size.

According to the present invention, it is possible to provide a dielectric composition that can implement a higher dielectric constant and good high temperature withstand voltage characteristics in the same grain size condition. It is expected that this effect can be effectively applied to the development of ultra high capacity MLCCs having a thin dielectric by implementing the same capacity while increasing the thickness of the dielectric than the case of applying the conventional dielectric material.

Further, according to the present invention, it is possible to manufacture a crystal grain having an appropriate domain size that can implement high capacity by applying a dielectric composition to dielectric products such as MLCC and performing appropriate physical treatments, such as heat treatment, pressing, and cooling, on the MLCC.

What is claimed is:

1. A dielectric composition comprising a base main component including Ba and Ti and an accessory component, wherein a ratio of domain width/grain size of the dielectric composition is in the range of more than 0 and equal or less than 0.2, and wherein the accessory component comprises:
   a first accessory component including one or more variable-valence acceptor elements selected from the group consisting of Mn, V, Cr, Fe, Ni, Co, Cu, and Zn, oxides thereof, and carbonates thereof;
   one or more second accessory components selected from the group consisting of fixed-valence acceptor elements of Mg and Al, oxides thereof, and carbonates thereof;
   a third accessory component including one or more rare-earth elements selected from the group consisting of Y, Dy, Ho, Er, Gd, Ce, Nd, and Sm, oxides thereof, and carbonates thereof;
   a fourth accessory component including a Ba element, oxides thereof, and carbonates thereof;
   a fifth component including Ca and Zr elements, oxides thereof, and carbonates thereof; and
   a sixth accessory component including Si and Al elements, oxides thereof, carbonates thereof, and glass including a Si element.

2. The dielectric composition according to claim 1, wherein the base is one or more selected from the group consisting of $BaTiO_3$, $(Ba_{1-x}Ca_x)(Ti_{1-y}Ca_y)O_3$ (here, $0 \leq x \leq 0.3$, $0 \leq y \leq 0.1$), $(Ba_{1-x}Ca_x)(Ti_{1-y}Zr_y)O_3$ (here, $0 \leq x \leq 0.3$, $0 \leq y \leq 0.5$), and $Ba(Ti_{1-y}Zr_y)O_3$ (here, $0 \leq y \leq 0.5$).

3. The dielectric composition according to claim 1, wherein a particle size of a starting material of the main component is less than 1.0 μm.

4. The dielectric composition according to claim 1, wherein the accessory component comprises 0.1 to 2.0 at % of the first accessory component; 0.1 to 2.0 at % of the second accessory component; 0.3 to 4.0 at % of the third accessory component; 0.4 to 4.0 at % of the fourth accessory component; 1.0 to 20 at % of the fifth accessory component; and 0.2 to 3.0 at % of the sixth accessory component.

5. The dielectric composition according to claim 1, wherein the dielectric composition satisfies X5R or X7R standards.

6. The dielectric composition according to claim 4, wherein, when the content of the second accessory component Mg is x and a ratio Ba/Si of the content of the fourth accessory component Ba to the content of the sixth accessory component Si is y, the relationship between x and y is in the range of upper and lower straight boundaries based on a dotted line y=1.2−0.64x of FIG. 1.

7. A multilayer ceramic capacitor formed by alternately laminating a dielectric layer using a dielectric composition according to claim 1 and an internal electrode layer.

8. The multilayer ceramic capacitor according to claim 7, wherein the dielectric layer has a thickness of greater than 0.1 μm after firing.

9. The multilayer ceramic capacitor according to claim 7, wherein the internal electrode layer is made of nickel or nickel alloys.

10. A multilayer ceramic capacitor formed by alternately laminating a dielectric layer using a dielectric composition according to claim 6 and an internal electrode layer.

11. The multilayer ceramic capacitor according to claim 10, wherein the dielectric layer has a thickness of greater than 0.1 μm after firing.

12. The multilayer ceramic capacitor according to claim 10, wherein the internal electrode layer is made of nickel or nickel alloys.

* * * * *